United States Patent
Jackson et al.

(10) Patent No.: US 6,292,767 B1
(45) Date of Patent: Sep. 18, 2001

(54) METHOD AND SYSTEM FOR BUILDING AND RUNNING NATURAL LANGUAGE UNDERSTANDING SYSTEMS

(75) Inventors: Eric G. Jackson, Menlo Park; Michael H. Cohen, Burlingame; Fuliang Weng, Palo Alto, all of CA (US)

(73) Assignee: Nuance Communications, Menlo Park, CA (US)

( * ) Notice: Subject to any disclaimer, the term of this patent is extended or adjusted under 35 U.S.C. 154(b) by 0 days.

(21) Appl. No.: 08/576,874

(22) Filed: Dec. 21, 1995

Related U.S. Application Data (60) Provisional application No. 60/001,511, filed on Jul. 18, 1995.

(51) Int. Cl.[7] .............................. G06F 17/20; G06F 17/27
(52) U.S. Cl. ........................................... 704/1; 704/9
(58) Field of Search ............................. 704/1, 9, 246, 704/247, 252, 257; 395/12, 705, 706, 707, 708; 707/530, 533

(56) References Cited

U.S. PATENT DOCUMENTS

| | | | |
|---|---|---|---|
| 4,752,958 | * 6/1988 | Cavazza et al. | 704/270 |
| 4,905,138 | * 2/1990 | Bourne | 704/9 |
| 5,060,154 | * 10/1991 | Duncan, IV | 704/1 |
| 5,101,349 | * 3/1992 | Tokuune et al. | 704/1 |
| 5,197,005 | * 3/1993 | Shwatz et al. | 704/1 |
| 5,369,574 | * 11/1994 | Masegi et al. | 704/8 |
| 5,384,833 | * 1/1995 | Cameron | 704/270 |
| 5,390,281 | * 2/1995 | Luciw et al. | 704/9 |
| 5,434,777 | * 7/1995 | Luciw | 704/8 |
| 5,487,147 | * 1/1996 | Brisson | 704/9 |
| 5,590,039 | * 12/1996 | Ikeda et al. | 704/9 |
| 5,617,486 | * 4/1997 | Chow et al. | 382/181 |
| 5,642,519 | * 6/1997 | Martin | 704/255 |
| 5,685,000 | * 11/1997 | Cox, Jr. | 704/9 |
| 5,701,490 | * 12/1997 | Safonov | 704/9 |

* cited by examiner

*Primary Examiner*—Patrick N. Edouard
(74) *Attorney, Agent, or Firm*—Townsend and Townsend and Crew LLP (57) ABSTRACT

A computerized method for building and running natural language understanding systems, wherein a natural language understanding system takes a sentence as input and returns some representation of the possible meanings of the sentence as output (the "interpretation") using a run-time interpreter that assigns interpretations to sentences and a compiler that produces (in a computer memory) an internal specification needed for the run-time interpreter from a user specification of the semantics of the application. The compiler builds a natural language system, while the run-time interpreter runs the system.

8 Claims, 8 Drawing Sheets

METHOD AND SYSTEM FOR BUILDING AND RUNNING NATURAL LANGUAGE UNDERSTANDING SYSTEMS

CROSS-REFERENCE TO RELATED APPLICATION

This application claims benefit of provisional patent application Serial No. 60/001,511, filed Jun. 18, 1995.

BACKGROUND OF THE INVENTION

The invention relates to language understanding and more particularly to a system for building and running natural language understanding systems. Language understanding systems are a type of system wherein meaning is ascribed to sentences of a human language. Constructing language understanding systems is generally a laborious process performed by experts in the field of natural language understanding. As the need intensifies for providing more sophisticated interfaces between machines and human beings, more sophisticated language understanding systems are needed, and more tools are needed to build language understanding systems.

What is needed specifically is a development system that allows a developer to easily create natural language understanding systems.

SUMMARY OF THE INVENTION

According to the invention, there is provided a computerized method for building and running natural language understanding systems, wherein a natural language understanding system takes a sentence as input and returns some representation of the possible meanings of the sentence as output (the "interpretation") using a run-time interpreter that assigns interpretations to sentences and a compiler that produces (in a computer memory) an internal specification needed for the run-time interpreter from a user specification of the semantics of the application. A typical tool according to the invention comprises two components:

1) a run-time interpreter that assigns interpretations to sentences; and
2) a compiler that produces (in a computer memory) the internal specification needed by the run-time interpreter from a developer's specification of the semantics of the application.

The compiler is the component that is used in building a natural language system, while the run-time interpreter is the component that is used in actually running this system.

The two components of a compiler and a run-time interpreter are highly interdependent. Without the internal specification produced by the compiler, the run-time interpreter cannot operate. The compiler itself has no function except to provide the internal specification needed by the run-time interpreter.

The invention will be better understood upon reference to the following detailed description in connection with the accompanying drawings.

DETAILED DESCRIPTION OF SPECIFIC EMBODIMENTS

Figure 1:
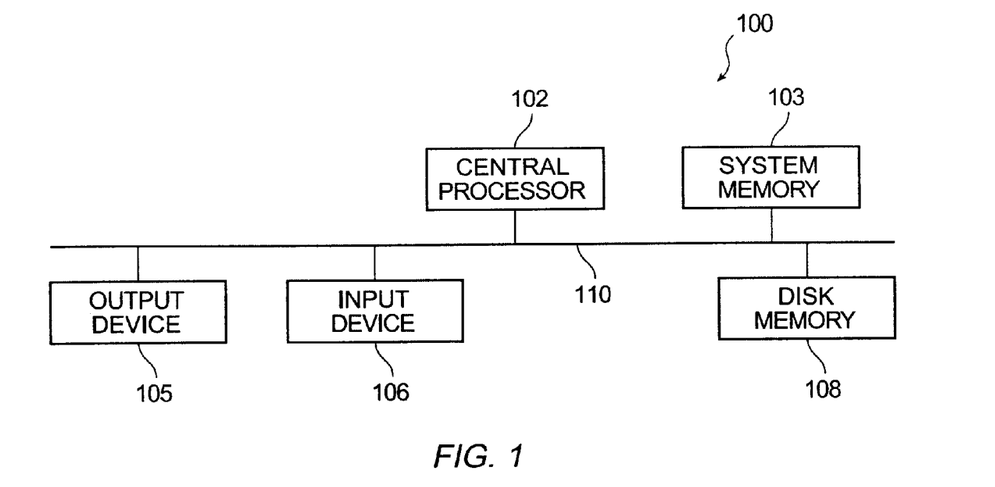
FIG. 1 is a block diagram of a computer system in which the invention may be embodied.

FIG. 1 is a block diagram of a computer system 100 in which the invention may be embodied. A specific embodiment of the invention is implemented on a computer system 100 having a processor 102, a system memory 103, an output device 105, an input device 106, a disk memory 108 and an interconnecting device 110, such as a system bus. Disk memory 108 may comprise fixed disks, diskettes, CD-ROMS, PCMCIA or other plug-in memory devices, and the like. Output device 105 may comprise screen displays such as CRTs, liquid-crystal display panels, printers, computer networks and the like. Input device 106 may comprise keyboards, microphones, pointing devices, modems, computer networks, and the like. A computer software program on the disk memory 108 and the system memory 103 generates machine instructions which implement the invention.

Figure 2:
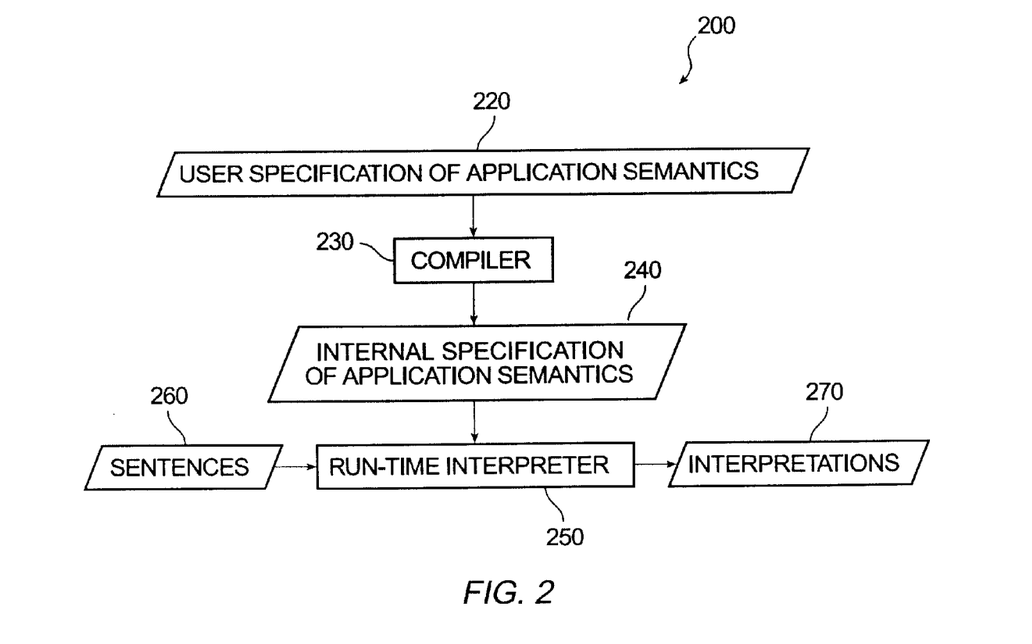
FIG. 2 is a block diagram of a development system according to the invention illustrating the flow of information for natural language understanding.

FIG. 2 is a block diagram of a system 200 according to the invention illustrating the flow of information for natural language understanding. A user specification 220 is provided as a description of the semantics of the application and can be manually input. A compiler 230 takes the semantic information from the user specification 220 as its input. If the compiler 230 finds no errors in the user specification 220, the compiler 230 generates an internal specification 240 of application semantics. The internal specification 240 contains the semantic information from the user specification 220, but in a form which can readily be used by a run-time interpreter 250. The run-time interpreter 250 takes as its input sentences 260 from which the run-time interpreter 250 generates interpretations 270 of the meaning to ascribe to each of the input sentences 260.

The interpretations produced by the run-time interpreter can be used in different ways. For example, the interpretations could be used to produce database queries, which, in turn, could be used to query an online database.

The compiler 230 which accepts the user specification 220 as described and creates the corresponding internal specification 240 of application semantics can be built using standard techniques and tools. A compiler suited to the present application is available from Corona Corporation of Menlo Park, Calif. Once the user specification 220 and the run-time interpreter 250 are hereinafter described in detail, the compiler 230 could be built by a person of ordinary skill in the art to generate a suitable internal specification 240. The Appendix shows an example of psuedocode for implementing the compiler 230.

Figure 3:
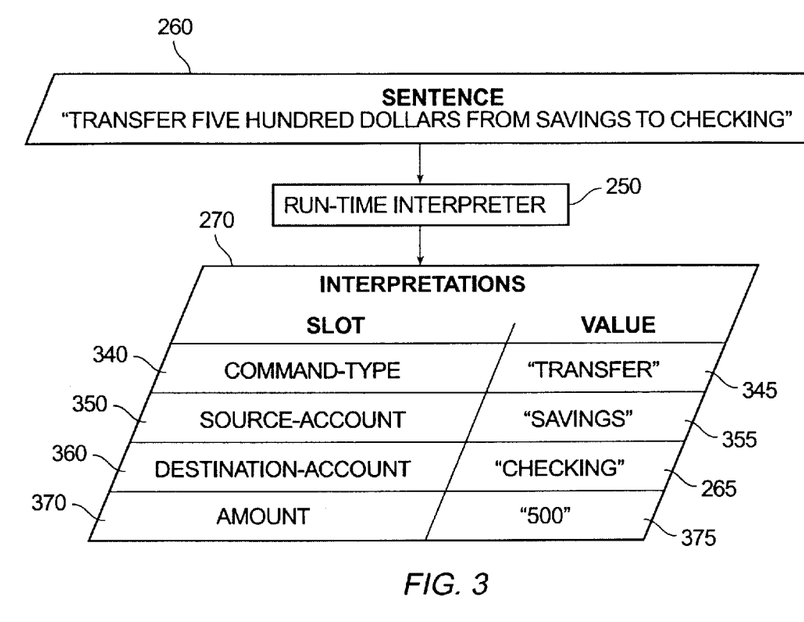
FIG. 3 shows an example sentence and the corresponding interpretation generated by the run-time interpreter.

FIG. 3 shows an example sentence 260 and a corresponding interpretation 270 which might be generated by the run-time interpreter 250 according to a user specification of semantics. The run-time interpreter 250 produces interpretations that comprise "slots" and corresponding values for these slots. In the example of FIG. 3, in which the user specification of semantics is for a hypothetical automated banking system, the interpretation for an input sentence 260, "Transfer five hundred dollars from savings to checking," might fill a command-type slot 340 with a value "transfer" 345, a source-account slot 350 with a value "savings" 355, a destination-account slot 360 with a value "checking" 365 and an amount slot 370 with a value "500" 375. This interpretation could be depicted as follows:

{<command-type transfer>
<source-account savings>
<destination-account checking>
<amount 500>}

Figure 4A:
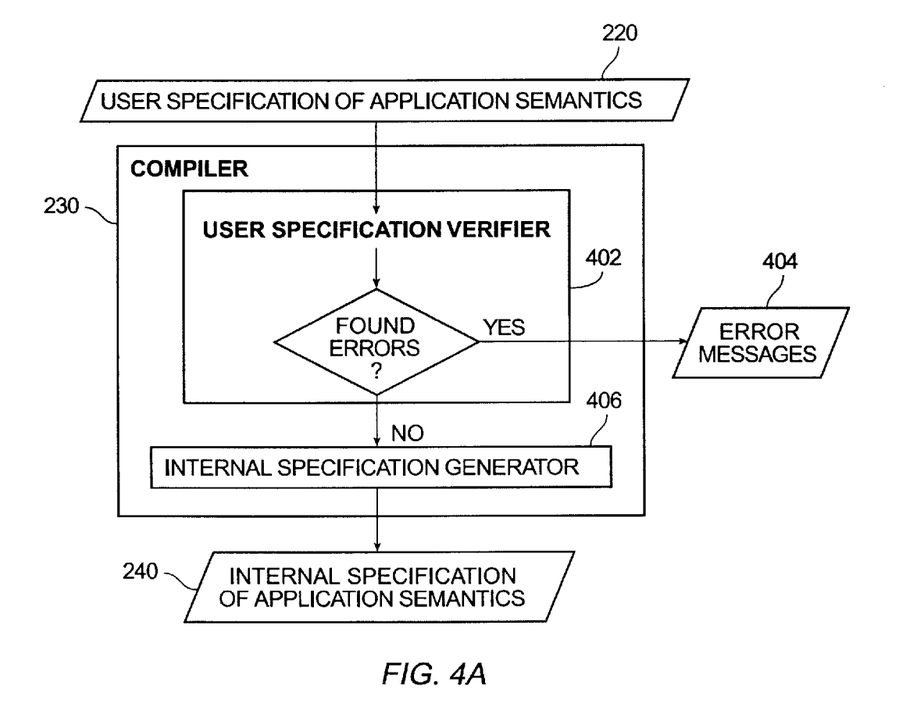
FIG. 4A is a block diagram showing the functional components of the compiler and illustrating the flow of information through the compiler.

FIG. 4A is a block diagram showing the functional components of the compiler 230 and illustrating the flow of information through the compiler 230. A user specification verifier 402 within the compiler 230 examines the input, user specification 220. The verifier 402 checks whether each component of the user specification 220 conforms to the format hereinafter described with reference to FIG. 4B. If the verifier 402 discovers errors, then the verifier will generate error messages 404 on an output device 105 (FIG. 1). If no errors are found, then an internal specification generator 406 will generate the internal specification 240 which is the output of the compiler 230. The compiler 230 can be used as a mere verifier of the correctness of the user specification 230 by discarding its output 240.

Figure 4B:
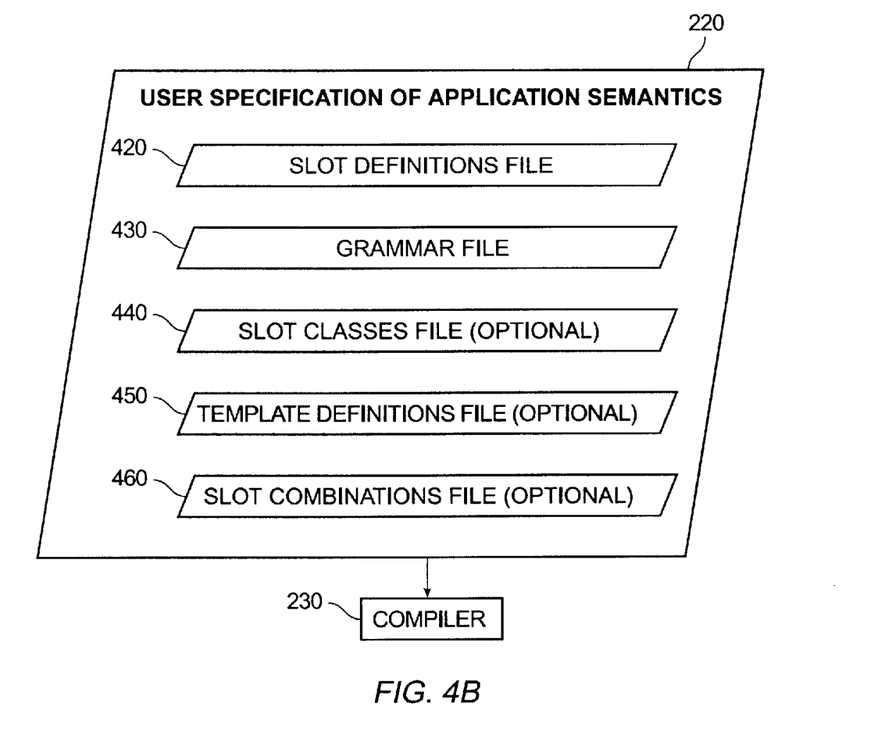
FIG. 4B depicts the components of the user specification of the semantics of the application.

FIG. 4B depicts the components of the user specification 220 of application semantics, produced by the developer, or user, who is not shown. The user specification 220 is the input taken by the compiler 230. The user specification 220 comprises several computer-resident files: a slot definitions file 420, a grammar file 430, and optionally any combination of a slot classes file 440, a template definitions file 450 and a slot combinations file 460. The compiler 230 accepts its input by reading said computer-resident files.

The slot definitions file 420 defines the slots for an application. The slot definitions file 420 simply lists the names of the slots that belong to the application. The grammar file 430 defines finite state grammars for matching phrases within each input sentence and allows certain commands, such as slot-filling commands, to be associated with these grammars. The optional slot classes file 440 defines classes of slots. The optional template definitions file 450 defines "templates" for an application. As hereinafter explained, a template defines a permissible set of slots and associated values that an interpretation 270 (FIG. 2) may contain. The slot combinations file 460 contains rules that constrain slot combinations.

Figure 5:
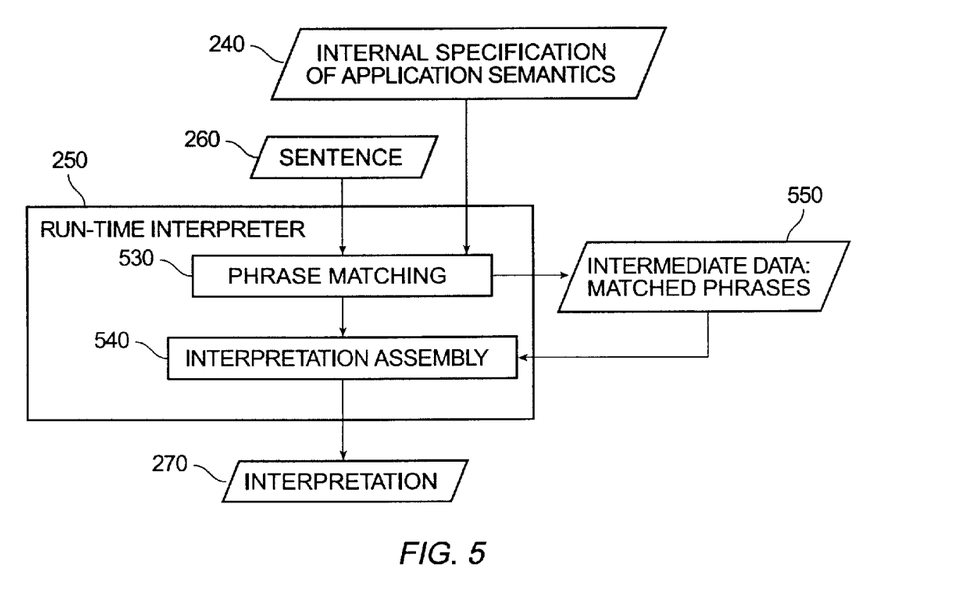
FIG. 5 is a block diagram showing the components of the run-time interpreter and illustrating the flow of information through the interpreter.

FIG. 5 is a block diagram showing the components of the run-time interpreter 250 and illustrating the flow of information through the interpreter. The interpreter 250 accepts as input a sentence 260 and the internal specification of semantics 240. The processing of the input sentence 260 comprises two steps. Step one is a phrase matching step 530, in which all phrases that match a grammar are identified and recorded in an intermediate data structure 550. The intermediate data structure 550 records the start and end points of each phrase, and the slots filled by that phrase. The intermediate data structure 550 can be thought of as a "phrase lattice." Step two is an interpretation assembly step 540, which finds all path(s) [hereinafter "paths"] through the lattice of phrases that are optimal (in a sense hereinafter defined) and returns the interpretation 270 that correspond to this path.

The grammar file 430 (FIG. 4B) defines finite state grammars via a regular-expression language and allows for the association of certain commands, such as slot-filling commands, with these grammars. At run-time, these grammars are matched against the input sentence 260, and various phrases that match these grammars are identified and kept track of in the intermediate data structure 550. The run-time interpreter 250 selects certain of the identified phrases in the intermediate data structure 550 to be used in building the interpretations 270 for the input sentence 260. The run-time interpreter 250 uses the commands associated in the grammar file 430 with the selected phrases in the intermediate data structure 550 in generating the interpretations.

The grammar file 430 (FIG. 4B) comprises one or more grammar definitions. A grammar definition consists of a grammar name followed by a grammar. Grammar files may include other grammar files via the #include directive. If a file contains the directive shown below, the effect is as if the contents of the file named "grammar-file" were present at the location of the directive: #include "grammar-file".

A grammar name is a sequence of alphanumeric characters containing at least one uppercase letter. A grammar is one of the following:

GrammarWithoutCommands {Command Command . . . Command}
GrammarWithoutCommands
A "GrammarWithoutCommands" is one of the following:
Word
GrammarName
(Grammar Grammar . . . Grammar)
[Grammar Grammar . . . Grammar]
*Grammar
+Grammar
?Grammar Words and grammar names are sequences of alphanumeric characters. Those sequences that include no uppercase characters are words. Those that do include at least one uppercase character are grammar names, as mentioned above. Furthermore, grammar names may be immediately followed by a colon (":") and a variable name (a sequence of alphanumeric characters).

The complex constructions in the grammar description language have the following meaning:

| | |
|---|---|
| (A B C . . .) | A sequence of A followed by B followed by C, etc. |
| [A B C . . .] | A disjunction, i.e., one of A or B or C etc. |
| *A | Zero or more occurrences of A |
| +A | One or more occurrences of A |
| ?A | An optional occurrence of A |

Thus, for example, the following grammar:
(*please [(go ?away) leave]) covers the word sequences shown below (among others):
"leave"
"please please go away"
"please go"

A "Command" is one of the following:

<Slot Value> return (Value)

(Note: The text "<," ">," "return(,"and ")," must appear in the command in accordance with the syntax herein.)

"Slot" must be a slot name defined in the slot definitions file. The possible sorts of things that "Value" can be will be described below. Examples of grammar definitions with commands include the following:

P (the {<slot1 13><slot2 65>} fish)

Q [fish cat dog] {return(animal)}

The function of slot-filling commands is to associate the filling of a slot, or slots, with a class of phrases. If the run-time interpreter identifies a phrase that matches a grammar with a slot-filling command, then the specified filled slot may be incorporated into the output interpretations.

Commands attach to the construction to their left. When the run-time interpreter matches portions of the input sentence against a grammar, the interpreter only "executes" a command in the grammar if a) the entire grammar is matched against the input sentence, and b) the construction the command is attached to is part of that match. For example, consider the following grammar definition:

P ([ the a {<slot 1>}] fish)

This grammar contains a slot-filling command which is attached to the word "a". The command is executed if the grammar is matched against the input sentence, and the word "a" is part of that match. Thus, the command is not executed in case of the following input:

"a dog"

"the fish"

In the first case, the command is not executed because the input does not match the grammar. In the second case, the command is not executed because the word "a" is not part of the match. The command is executed in case of the following input:

"a fish"

If the run-time interpreter matches a phrase against a grammar, but does not execute a slot-filling command in that grammar, then the specified filled slot is not associated with the identified phrase, and will not be added to an interpretation built using that phrase. The attachment of a command to a construction has precedence over the attachment of a unary operator (*, + or ?) to a construction. Thus, the command "<slot 1>" in the grammar below attaches to the construction "[fish dog]", not to the construction "?[fish dog]":

P ?[fish dog] {<slot 1>}

Return commands allow a value to be associated with phrases that match a grammar. For example, the following grammar associates a code with several different ways of specifying an airport:

Airport [logan

{return(LOGAN)}

(logan airport)

{return(LOGAN)}

(s f o)

{return(SFO)}

(san francisco international airport)

{return(SFO)}

Return values can be placed into slots via the use of variables. The following grammar illustrates this together with the "Airport" grammar just given:

Constraint [(from Airport:orig) {<origin $orig>}

(to Airport:dest) {<destination $dest>}

The first line says that a phrase consisting of "from" followed by an airport name should cause the origin slot to be filled with the value returned from the Airport grammar. The second line says that a phrase consisting of "to" followed by an airport name should cause the destination slot to be filled with the value returned from the Airport grammar.

Variables must be preceded by "$" when they are referenced, but not when they are set. Furthermore, they must be set before they are referenced. The variable "string" is reserved and has a special meaning. It is automatically set to be identical to a certain portion of the input string. For example, in the following grammar the value that is returned is identical to the portion of the input string that matches the grammar:

Day [sunday monday tuesday wednesday thursday friday saturday]

{return($string)}

The portion of the input string that "$string" gets set to is determined as follows. First note that every occurrence of "$string" is within some command. Next recall that every command attaches to the construction that precedes it. For example, the return command in the above grammar attaches to the whole "or" construction. The rule then is that an occurrence of "$string" is set to the sequence of words that match the construction that the occurrence's containing command is attached to. So the occurrence of "$string" in the above grammar is set to the sequence of words that match the "or" construction (in this case, just a single-word sequence).

A "Value" is one of the following:

Integer

String

Variable

FunctionExpression

FeatureStructure

"Integer" is a positive or negative whole number. "String" is a sequence of alphanumeric characters, or, alternatively, a sequence of arbitrary characters enclosed in double quotes. "Variable" is one of the following:

$VarName $VarName.Feature.Feature . . . Feature "VarName" and "Feature" are sequences of alphanumeric characters.

A "FunctionExpression" has the following syntax:

FunctionName(Value Value . . . Value)

"FunctionName" is one of the following:

add sub mul div neg strcat

These functions perform the following operations:

add Takes two integers and returns their sum.

sub Takes two integers and returns the result of subtracting the second from the first.

mul Takes two integers and returns their product.

div Takes two integers and returns the result of dividing the first by the second.

neg Takes one integer and returns the negative counterpart if the number is positive, or the positive counterpart if the number is negative.

strcat Takes two strings and returns the concatenation of the two.

A "FeatureStructure" has the following syntax:

<Feature Value> <Feature Value> . . . <Feature Value>

"Feature" is a sequence of alphanumeric characters. Individual feature values within a structure can be referenced by variable expressions. For example, consider the following:

p (Date:d) {<month-slot $d.month>}

Date (march third) {return([<month march> <day 3>])}

The variable "d" gets set to the structure "[<month march> <day 3>]". Then the month feature of the structure "d"is referenced via the expression "$d.month" and placed in the slot "month-slot".

Referring back to FIG. 4B, the optional slot classes file 440 defines classes of slots. It contains one or more slot class definitions. A slot class definition has the following syntax:

Class (SlotOrClass SlotOrClass . . . SlotOrClass)

"SlotOrClass" is a slot defined in the slot definitions file 420, or a class defined somewhere else in the slot classes file 440. The membership of a slot in a class is defined as follows:

If Slot appears within the list of slots and classes defining Class, then Slot is a member of Class.

If Slot is a member of Class1 and Class1 appears within the list of slots and classes defining Class2, then Slot is a member of Class2.

No circular definitions are allowed. For example, "Class1" cannot be defined in terms of "Class2" if "Class2" is defined in terms of "Class1".

The template definitions file 450 contains one or more template definitions. A template definition has the following syntax:

(SlotSpecification SlotSpecification etc.)

A "SlotSpecification" is one of the following:

Slot

SlotClass

<Slot Value>

<SlotClass Value>

"Slot" must be a slot defined in the slot definitions file. "SlotClass" must be a slot class defined in the slot classes file.

The effect of template definitions on the run-time interpreter is the following. Every interpretation must correspond to at least one template if templates are defined. For an interpretation to correspond to a template, each filled slot in the interpretation must match at least one slot specification in the template definition. A filled slot, i.e., "<Slot Value>", matches a slot specification in the following circumstances:

If the slot specification is of the form "S", where S is a slot, then there is a match if S is identical to Slot.

If the slot specification is of the form "C", where C is a slot class, then there is a match if Slot is a member of C.

If the slot specification is of the form "<S V>" where S is a slot, then there is a match if S is identical to Slot and V is identical to Value.

If the slot specification is of the form "<C V>" where C is a slot class, then there is a match if Slot is a member of C and V is identical to Value.

The slot combinations file 460 contains one or more slot combination rules. A slot combination rule has one of the following two forms:

SlotSpecification→MUST SlotSpecification

SlotSpecification→MUST NOT SlotSpecification

The effect of these rules on the run-time interpreter is the following. Every interpretation must obey all the slot combination rules. An interpretation obeys a rule of the form "SlotSpec1→MUST SlotSpec2" if either: a) No filled slot in the interpretation matches "SlotSpec1", or b) Some filled slot in the interpretation matches "SlotSpec2". An interpretation obeys a rule of the form "SlotSpec1→MUST NOT SlotSpec2" if either: a) No filled slot in the interpretation matches "SlotSpec1"; or b) No filled slot in the interpretation matches "SlotSpec2". For example, there could be a slot combination rule such as the following:

<command-type balance>→MUST NOT destination-account

The above example states that if the "command-type" slot is filled with "balance" it is not possible to fill the destination-account slot.

Figure 6:
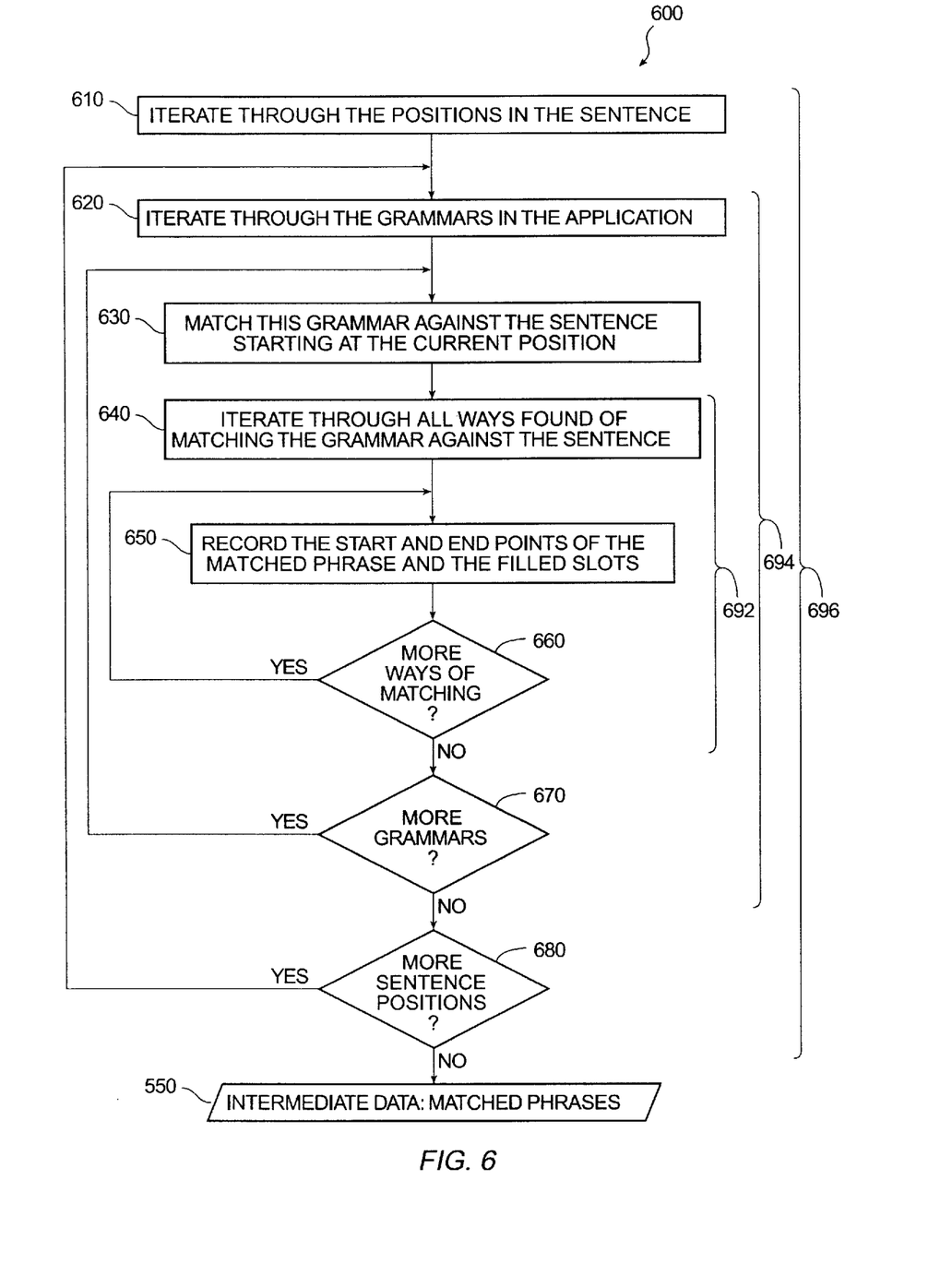
FIG. 6 is a flowchart illustrating the steps involved in matching phrases from the sentence to grammars.

FIG. 6 is a flowchart illustrating the steps involved in a specific technique for matching phrases from the sentence to grammars. Other techniques are within the spirit and scope of the invention. Recall that in the phrase matching stage 530, all phrases that match a grammar are identified and recorded in an intermediate data structure 550. The phrase matching stage 530 contains three nested loops. A first loop 696, iterates 610 through the positions in the input sentence. A second loop 694, nested within the first loop 696, iterates 620 through the grammars in the application. Within the second loop 694, then, in each iteration there is one current position in the sentence and one grammar of interest. Within the second loop 694, a matching function 630 tries to match the one grammar of interest against the input sentence starting from the current position. The matching function 630, detailed hereinafter in FIG. 8, finds zero, one, or more than one phrases starting from the current position that match the grammar of interest. A third loop 692, which follows the matching function 630 within the second loop 694, iterates 640 over all the matching phrase(s) found by the matching function 630. A recording step 650 within third loop 692 stores information from each matching phrase into an accumulating intermediate data structure, which upon final exit 660, 670, 680 from all loops, is the intermediate data structure 550. Recall that grammars are associated with slot-filling commands. Thus, when matching function 630 finds a phrase that matches a grammar, the match is associated with a set of filled slots. The information which is stored in the intermediate data structure comprises the start and end points of the matched phrase and the filled slots corresponding to the matched phrase.

Figure 7:
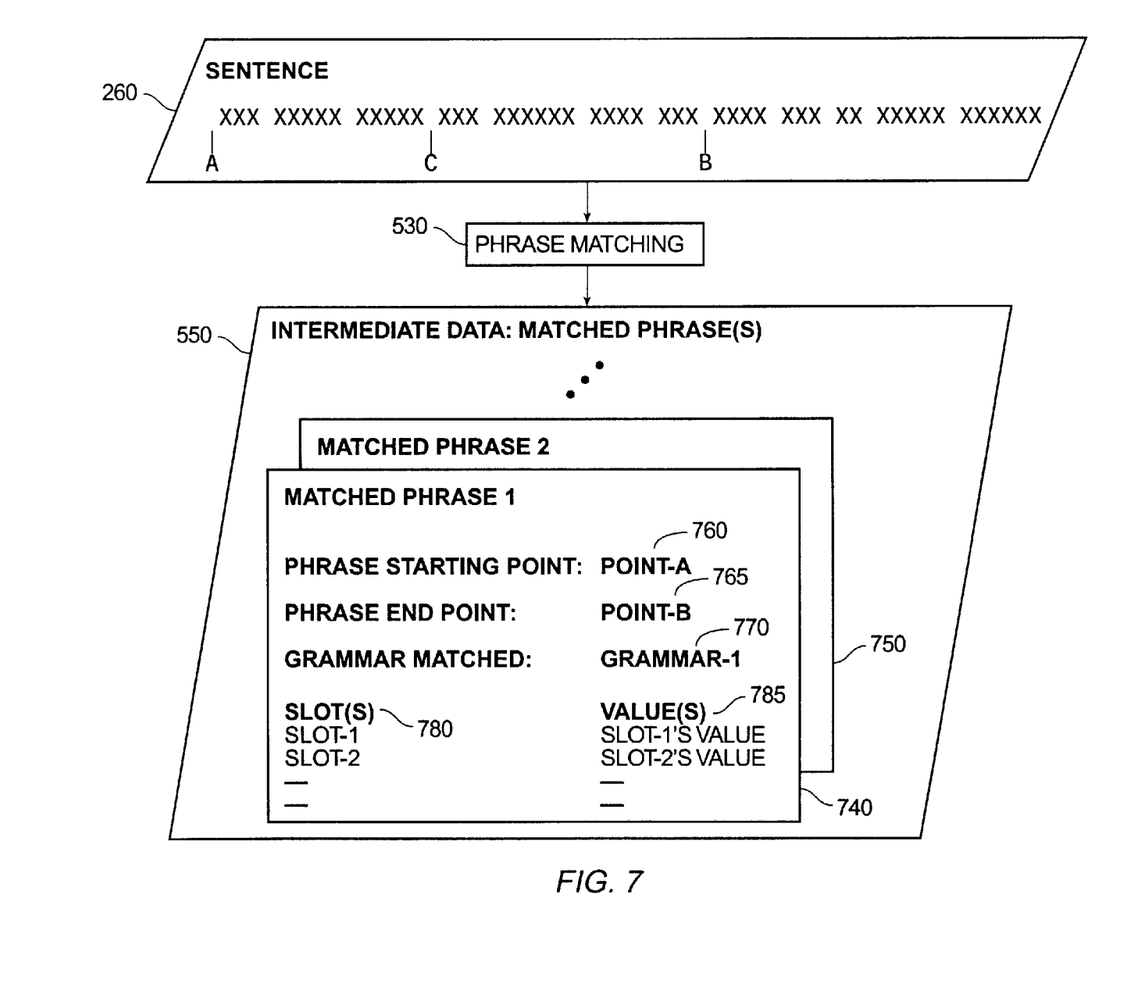
FIG. 7 depicts the contents of the intermediate data produced by the phrase matching component of the run-time interpreter.

FIG. 7 depicts in schematic form, for additional clarity, the contents of an intermediate data structure 550. The intermediate data structure 550 is produced by the phrase matching component 530 from an input sentence 260. Recall that the intermediate data structure 550 must contain records of every phrase from the input sentence 260 which matched a grammar. Two example schematic matched phrase records, 740 and 750, are shown. Each record of a matched phrase contains a phrase starting point 760, a phrase end point 765, and zero or more slots filled 780 and the filled slots' corresponding values 785.

Figure 8:
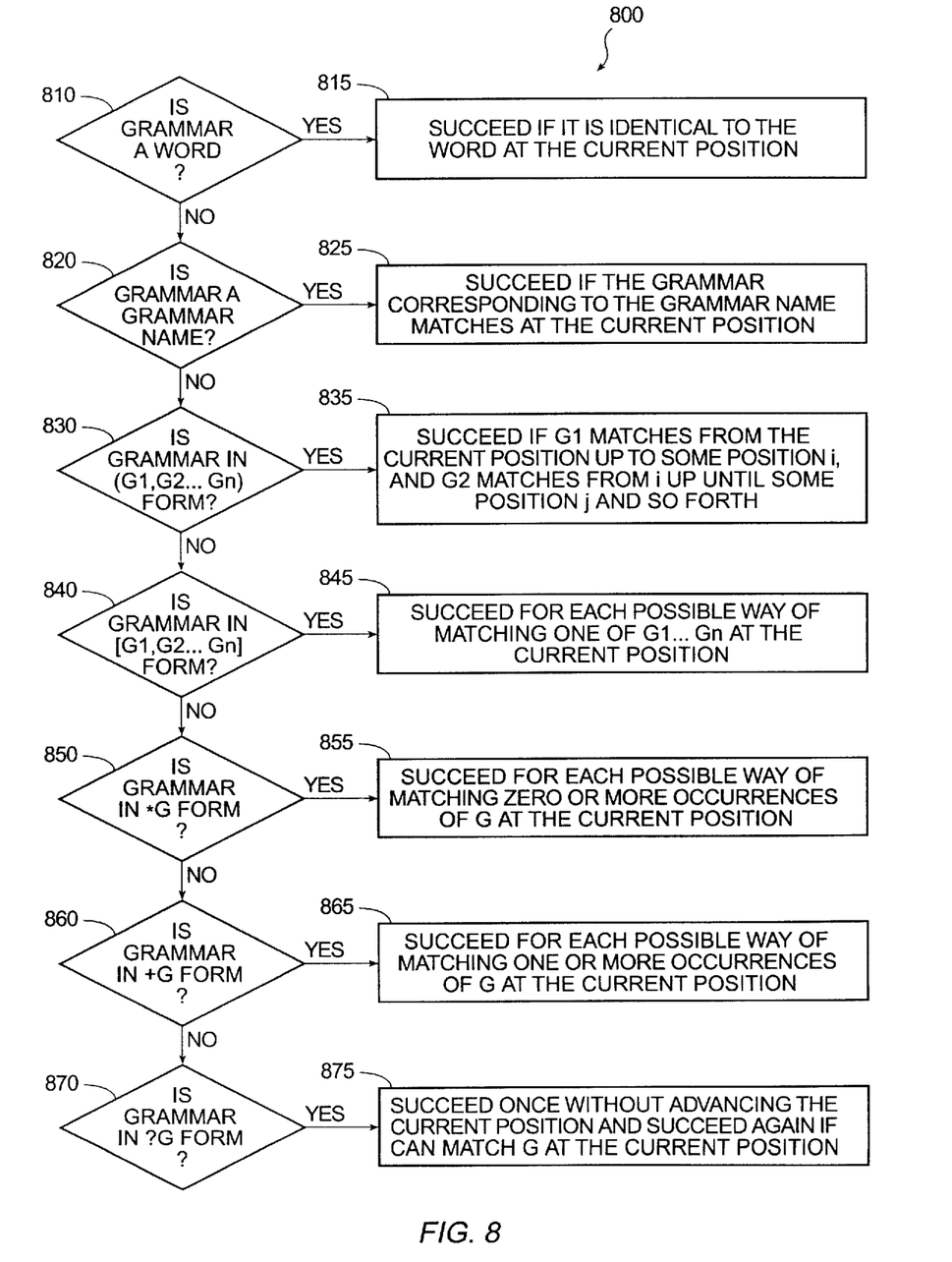
FIG. 8 depicts the method for matching a single grammar to a sentence starting at a certain position.

FIG. 8 depicts the method 630 for matching a single grammar to a sentence starting at a certain position. The grammar is matched to text starting from a current position in seven possible ways. In a first situation 815 in which the grammar is a word 810, a match will be found if the word is identical to the word at the current position. In a second situation 825, in which the grammar is a grammar name 820, a match will be found for every possible way of matching the grammar corresponding to the grammar name to the input sentence starting at the current position. In a third situation 835, in which the grammar is a sequence of grammars in the form "(G1 G2 . . . Gn)" 830, a match for the sequence will be found for every way of matching all components of the sequence in order, i.e., such that grammar "G1" matches from the current position up to some position "i", and "G2" matches from "i" up until some position "j", and so forth until "Gn" is matched. In a fourth situation 845, in which the grammar is of the form "[G1 G2 . . . Gn]" 840, a match will be found for each possible way of matching one of grammars "G1", . . . , "Gn". In a fifth situation 855, in which the grammar is of the form "*G" 850, a match will be found for each possible way of matching zero or more occurrences of grammar "G". In a sixth situation 865, in which the grammar is of the form "+G" 860, a match will be found for each possible way of matching one or more occurrences of grammar "G". In a seventh situation 875, in which the grammar is of the form "?G" 870, a match will be found once without advancing the current position, and another match will be found if grammar "G" can be matched. In the course of matching a grammar, the matching method 630 will also keep track of what variables have been set to what values, what slots have been set to what values, and the most recently specified return value (if any). These information are needed for the recording step 650 in FIG. 6. The seven ways discussed above of matching a grammar make use of each other. For example, matching a grammar in the fourth situation 845, in which the grammar is of the form "[G1 G2 . . . Gn]", requires individual matches of "G1", . . . , "Gn" using any of the seven ways of matching. Matching method 630 can be implemented as a computer program or subroutine which can call itself recursively.

The interpretation assembly step 540 (FIG. 5) finds paths through the intermediate data structure 550 phrase lattice that are optimal (in a sense hereinafter defined). A path comprises a sequence of phrases and word skips. Every complete path uses every word in the sentence exactly once; that is, each word in the sentence is either a) skipped, or b) part of exactly one phrase in the path. Every path corresponds to an interpretation; specifically, the interpretation produced by combining the filled slots associated with each phrase in the path. The interpretations produced by interpretation assembly step 540 are the interpretations corresponding to optimal paths through the phrase lattice.

In the preferred embodiment, an optimal path is one that uses up the most words. In other words, an optimal path is one that has the fewest word skips. In case multiple paths use the most words, the optimal paths are ones that use the most words and are built from the fewest phrases among paths using the most words. Other definitions of optimality are possible.

In the preferred embodiment, the method for finding the best paths through the phrase lattice, given a definition of optimality, is a dynamic programming method. The method is to iterate through the positions in the sentence from the end to the beginning, identifying the best partial paths starting at each position. Determining the best partial paths at position "i" requires looking at the identified phrases that start at "i", and the best partial paths associated with the end of these phrases.

Figure 9:
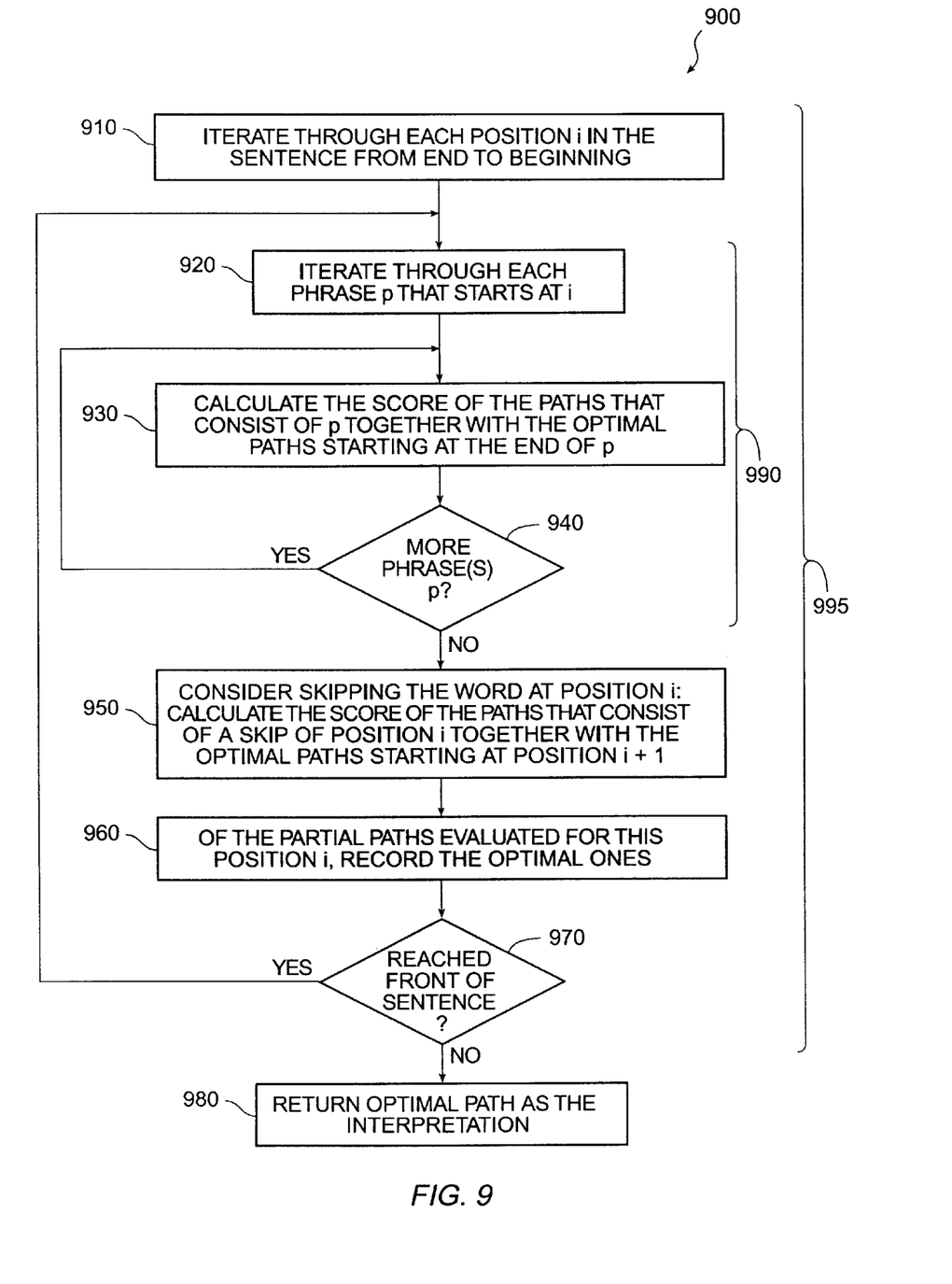
FIG. 9 is a flowchart illustrating the method for finding the best path through the phrase lattice in a simple case.

FIG. 9 is a flowchart illustrating a method 900 for finding the best paths through the phrase lattice in the simple case where there are no templates or slot combination rules. The method 900 contains two loops. A first loop 995 iterates 910 through each position "i" in the input sentence from end to beginning. A second loop 990, nested within first loop 995, iterates 920 through each phrase "p" that starts at position "i". Within the second loop 990, then, there is one current phrase "p" and one current position "i". Within the second loop 990, a "no skip" scoring step 930 calculates the score of the paths that consists of "p" together with the optimal paths starting at the end of p. After the second loop 990 is finished 940 a "skip" scoring step 950 considers the path which consists of skipping the word at position "i". The "skip" scoring step 950 calculates the score of the paths that consists of a skip of position "i" together with the optimal paths starting at position "i"+1. In a recording step 960, the partial paths scored for this position "i" in the "no skip" scoring step 930 and the "skip" scoring step 950 are compared and the optimal partial paths are recorded. After the front of the sentence is reached 970, the interpretations corresponding to the remaining paths, which are the optimal paths, are returned in an output step 980. The score that is calculated for partial paths in path finding method 900 comprises the number of words and the number of phrases in the paths.

If there are templates or slot combination rules, then the method is more complex. More paths may need to be recorded at each position than just the "optimal" paths. To see why this is so, imagine that all optimal paths at position "i" contain phrases that are incompatible with a certain template "T". Although these paths are optimal at "i", they may turn out to be bad paths if all the phrases in the rest of the sentence are compatible only with "T". In this case, the method should record at position "i" the best paths that are compatible with "T".

Now the notion of the state of a path is defined. The state of a path comprises the information of:

a) which templates the path is compatible with;

b) which slot combination rules the path triggers; and c) which slot combination rules the path satisfies.

A rule is said to have been "triggered" by a path if the path contains a phrase which fills a slot that matches the slot specification on the left hand side of the rule. A rule is said to have been "satisfied" by a path if the path contains a phrase which fills a slot that matches the slot specification on the right hand side of the rule.

In the dynamic programming search, the method records at each position "i" the best partial paths for each state active at "i". (A state is active at "i" if there is at least one path starting at "i" that has that state.) Some states are "illegal". For example, if there is a rule "slot1→MUST NOT slot2" and a path fills slots slot1 and slot2, then that path corresponds to an illegal state. Such a path can be discarded from the dynamic programming search.

Figure 10:
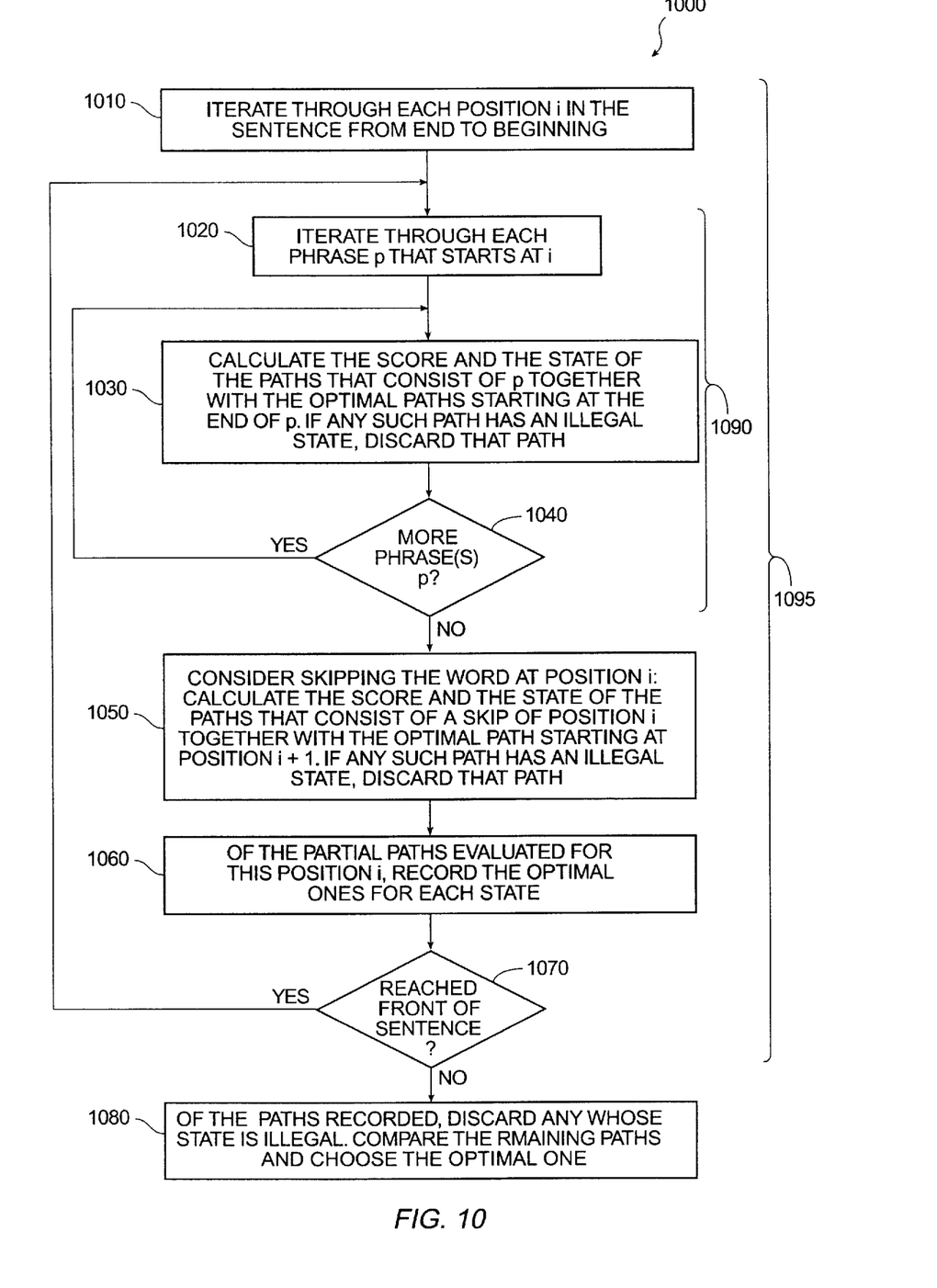
FIG. 10 is a flowchart illustrating the method for finding the best path through the phrase lattice in the general case.

FIG. 10 is a flowchart illustrating the full method for finding the best path through the phrase lattice in the general case. The full method 1000 contains two loops. The first loop 1095 iterates 1010 through each position "i" in the sentence from end to beginning. The second loop 1090, nested within the first loop 1095, iterates 1020 through each phrase "p" that starts at position "i". Within the second loop 1090, then, there is one current phrase "p" and one current position "i". Within the second loop 1090, a "no skip" scoring step 1030 calculates the score of the paths that consist of "p" together with the paths starting at the end of "p" which are optimal for each state active at the end of "p". If any such path which contains "p" has an illegal state, it can be discarded within the "no skip" scoring step 1030. After the second loop 1090 is finished a "skip" scoring step 1050 considers the path which consists of skipping the word at position "i". The "skip" scoring step 1050 calculates the score and the state of the paths that consist of a skip of position "i" together with the paths starting at position "i" +1 which are optimal for each state active at "i" +1. If any such path which skips position "i" has an illegal state, it can be discarded within the "skip" scoring step 1050. In a recording step 1060, all partial paths scored for position "i" in the "no skip" scoring step 1030 and the "skip" scoring step 1050 are compared and the optimal paths for each active state are recorded. After the front of the sentence is reached 1070 the recorded paths are examined in an output step 1080. Certain states that were legal now become illegal (e.g., if there is a rule "slot1→MUST slot2", then a state corresponding to "slot1" but not "slot2" being filled is illegal). Paths corresponding to these illegal states can be eliminated. The remaining paths can then be compared and those that are not optimal can be discarded. The interpretations corresponding to the remaining optimal paths are then returned.

The present invention improves over previous methods for building and running natural language understanding systems by making the process of building natural language systems much easier. It is easy in that systems can be built quickly, and in that systems can be built by developers who possess little or no expertise in natural language understanding. This ease of use is largely a result of the kind of specification of the semantics of the application that the compiler and run-time interpreter have been designed to handle.

Pseudo-code is provided in the attached Appendix as an example of one implementation of the main portion of the compiler 230.

The invention has now been explained with reference to specific embodiments. Other embodiments will be apparent to those of ordinary skill in the art. It is therefore not intended that this invention be limited, except as indicated by the appended claims.

METHOD AND SYSTEM FOR BUILDING AND RUNNING NATURAL LANGUAGE UNDERSTANDING SYSTEMS

APPENDIX

EXAMPLE OF PSEUDO CODE FOR IMPLEMENTING MAIN PORTION OF COMPILER

```
ReadGrammarFile()
   While not end-of-file
      grammar_name=ReadToken()
      grammar_def=ReadConstruction(TOP_MODE)
      Add pair of grammar_name and grammar_def to list
         of grammar definitions
ReadConstruction(mode)
   token=ReadToken()
   If token is "("
      ReadAnd()
   Else if token is "["
      ReadOr()
   Else if token is "*"
      construction=ReadConstruction(TOP_MODE)
      ReadCommandsOptionally()
      Return Kleene Closed construction formed from con-
         struction
   Else if token is "+"
      construction=ReadConstruction(TOP_MODE)
      ReadCommandsOptionally()
      Return Positive Closed construction formed from con-
         struction
   Else if token is "?"
      construction=ReadConstruction(TOP_MODE)
      ReadCommandsOptionally()
      Return Optional construction formed from construction
   Else if token is ")"
      If mode==AND_MODE
         Return NULL
      Else
         Generate error
   Else if token is "]"
      If mode==OR_MODE
         Return NULL
      Else
         Generate error
   Else if token is grammar name
      Add grammar
   Else if token is word
      Add word
ReadAnd()
   Do
      Child=ReadConstruction(AND_MODE)
   Until Child==NULL
   ReadCommandsOptionally()
   Return AND construction formed from read children
ReadOr()
   Do
      Child=ReadConstruction(OR_MODE)
   Until Child==NULL
   ReadCommandsOptionally()
   Return OR construction formed from read children
ReadToken
   Read white space
   Do
      c=ReadCharacter()
      If c is "(", ")", "[", "]", "*", "+", "?", "$", "{", "}",
         "<" or ">"
         If no other characters have been read, return c.
      Else if c is not white space
         Add c to token under construction
   Until c was not added to token under construction
   ReadCommandsoptionally()
   Return grammar name or word construction formed from
      token
ReadCommandsoptionally()
   token=ReadToken()
   If token is "{"
      Do
         token=ReadToken()
         If token=="return"
            Read "("
            val=ReadValue()
            Read ")"
            Add return command formed from val to com-
               mands being assembled
         Else if token=="<"
            slot=ReadToken()
            val=ReadValue()
            Read ">"
            Add slot-filling command formed from slot and val to
               commands being assembled
      Until token is "}"
   Return assembled commands
ReadValue()
   token=ReadToken()
```

```
If token is "$"
  var=ReadToken()
  while next character is a period
    feature=ReadToken()
    Add feature to feature list being assembled
  Return variable formed from var and assembled feature
    list
Else if token is "["
  Do
    feature=ReadToken()
    If feature is not "]"
    value=ReadValue()
    Add feature-value pair formed from feature and
      value to structure
        under construction
  Until feature=="]"
  Return structure formed from feature-value pairs
Else if token is "add", "minus", "times", "divide" or
    "strcat"
  Read "("
  value1=ReadValue()
  value2=ReadValue()
  Read ")"
  Return function expression formed from value1 and
    value2
Else if token is "neg"
  value1=ReadValue()
  Return function expression formed from value1
Else if token is an integer
  Return integer value formed from token
Else
  Return string value formed from token
```

What is claimed is:

1. A development system on a digital computer for building a computer-aided natural language understanding system, said development system comprising in combination:

an input means, said input means for accepting as input a user specification of application semantics;

a compiler means, said compiler means for checking said user specification for errors according to a pre-defined user specification format and for producing an internal specification of application semantics from said user specification, said internal specification for supplying said application semantics to a run-time interpreter, said run-time interpreter for assigning interpretations to input sentences, said interpretations comprising slots supplied with values.

2. The development system according to claim 1 wherein said run-time interpreter is operative to assign said interpretations according to grammars.

3. The development system according to claim 2 wherein said pre-defined user specification format includes a grammar format, said grammar format defining structure of a grammar specification within said user specification, said grammar specification defining said grammars.

4. The development system according to claim 3 wherein said grammar format provides for associating commands with said grammars, said commands for supplying said slots with values.

5. The development system according to claim 4 wherein said commands include at least one command for supplying a variable with a value.

6. The development system according to claim 1 wherein said pre-defined user specification format includes a slot class format, said slot class format defining structure of a slot class specification within said user specification, said slot class specification defining classes of slots.

7. The development system according to claim 1 wherein said pre-defined user specification format includes a template format, said template format defining structure of a template specification within said user specification, said template specification defining templates, each of said templates comprising a collection of slot specifications, each of said interpretations being required to correspond to one of said templates such that all said slots within said each of said interpretations match said slot specifications within said corresponding template.

8. The development system according to claim 1 wherein said pre-defined user specification format includes a slot combination format, said slot combination format defining structure of a slot combination specification within said user specification, said slot combination specification defining allowable and unallowable combinations of slots within said interpretations.

* * * * *